US012759855B2

(12) United States Patent
Petrini et al.

(10) Patent No.: US 12,759,855 B2
(45) Date of Patent: Oct. 13, 2026

(54) CLOSING ASSEMBLY FOR CAPPING HEAD FOR CAPPING MACHINE AND CAPPING MACHINE

(71) Applicant: AROL S.P.A., Canelli (IT)

(72) Inventors: Cesare Petrini, Canelli (IT); Massimiliano Scaglione, Canelli (IT); Matteo Sforzini, Canelli (IT)

(73) Assignee: AROL S.P.A., Canelli (IT)

( * ) Notice: Subject to any disclaimer, the term of this patent is extended or adjusted under 35 U.S.C. 154(b) by 0 days.

(21) Appl. No.: 19/110,026

(22) PCT Filed: Sep. 12, 2023

(86) PCT No.: PCT/IB2023/059019

§ 371 (c)(1),
(2) Date: Mar. 7, 2025

(87) PCT Pub. No.: WO2024/057196

PCT Pub. Date: Mar. 21, 2024

(65) Prior Publication Data

US 2026/0070771 A1 Mar. 12, 2026

(30) Foreign Application Priority Data

Sep. 12, 2022 (IT) ........................ 102022000018603

(51) Int. Cl.
*B67B 3/12* (2006.01)

(52) U.S. Cl.
CPC ............ *B67B 3/12* (2013.01); *B67B 2201/10* (2013.01)

(58) Field of Classification Search
CPC .............................. B67B 3/12; B67B 2201/10
See application file for complete search history.

(56) References Cited

U.S. PATENT DOCUMENTS 3,076,300 A * 2/1963 Luedi ........................ B67B 3/18 53/340
3,771,283 A * 11/1973 Over ......................... B67B 3/12 413/8

(Continued)

FOREIGN PATENT DOCUMENTS

EP 1182165 A1 * 2/2002 ............... B67B 3/28
GB 442688 A 2/1936
WO 2022/172207 A1 8/2022

OTHER PUBLICATIONS

International Search Report and Written Opinion of the International Searching Authority issued for International PCT Application No. PCT/IB2023/059019 on Dec. 12, 2023.

*Primary Examiner* — Thomas M Wittenschlaeger
(74) *Attorney, Agent, or Firm* — Howson & Howson LLP

(57) ABSTRACT

A closing assembly for applying crown caps is provided. The closing assembly has a small footprint, is easily and quickly replaceable, and is apt to be installed on roto-translating capping heads mounted to capping machines that can handle both applications involving roto-translation of the capping heads and applications involving only translation of the capping heads. The capping machine has a gear system in which the driving sprocket can be rotatably adjusted so as to annul the rotational movement component of the capping heads around their axes and maintain solely the translational movement component, allowing correct operation of the closing assembly. The closing assembly (1) may have a remarkably small footprint by virtue of the use of two or more ejector springs that are concentric and parallel to each other.

20 Claims, 12 Drawing Sheets

(56) References Cited

U.S. PATENT DOCUMENTS

| | | | | | |
|---|---|---|---|---|---|
| 3,832,892 | A * | 9/1974 | Bohl | B67B 3/12 | 73/818 |
| 4,205,502 | A * | 6/1980 | Ahlers | B67B 3/12 | 53/367 |
| 8,353,145 | B2 * | 1/2013 | Zanini | B67B 3/10 | 53/317 |
| 11,174,142 | B2 * | 11/2021 | Boscaro | B67B 3/2066 | |
| 2012/0186194 | A1 * | 7/2012 | Schlieper | B67B 3/18 | 53/317 |
| 2020/0131014 | A1 * | 4/2020 | Boscaro | B67B 3/2013 | |

* cited by examiner

CLOSING ASSEMBLY FOR CAPPING HEAD FOR CAPPING MACHINE AND CAPPING MACHINE

TECHNICAL FIELD

The present invention relates to the field of capping machines for applying caps to containers.

More specifically, the subject of the present invention is a closing assembly that can be mounted on a capping head of a capping machine, for applying caps to containers.

Even more specifically, the closing assembly according to the invention can be used for applying crown caps to bottles.

The present invention further relates to a capping machine provided with a capping head on which such closing assembly can be installed.

BACKGROUND ART

Capping heads are devices that make it possible to apply a cap or seal to the mouth of containers such as bottles, small bottles, etc.

Such heads are usually employed in capping machines generally comprising a movable support which moves a plurality of said heads following a path along which the containers are conveyed. For example, the capping heads are mounted on the periphery of a capping machine support that is rotated to sequentially bring the containers and the heads to a capping position.

Different capping machines and different capping heads are known, the design of which differs depending on the type of closure dictated by the cap and the type of container to which the cap is to be applied.

For example, in order to be able to apply crown caps to bottles, capping machines must be designed so that they can apply a load such as to ensure the correct application of the cap and the subsequent crimping of the cap so that the crown cap becomes joined to the bottle, in particular to the bottle finish.

In this case, the capping head must be mounted to the capping machine in such a way as to be able to perform a downward translational movement in a vertical direction, in order to be able to reach the bottle and apply the cap thereto, and an upward translational movement, in order to release the bottle once capping is completed.

An example of a known capping machine for applying crown caps to bottles is shown in FIG. 1.

For simplicity of illustration, in FIG. 1 a single capping head 110 has been mounted to the capping machine 100 for applying crown caps, but in practice a capping machine generally has a plurality of capping heads, arranged circumferentially at regular intervals around a turret 102.

The capping machine 100 comprises an upper plate 120*a* and a lower plate 120*b*, which are aligned with the turret 102 and have respective seats 122*a*, 122*b*, arranged circumferentially at regular intervals and aligned with each other. The capping heads 110 are accommodated in the seats 122*a* of the upper plate 120*a*, while the seats 122*b* of the lower plate 120*b* carry supports 124 for respective bottles B, so that alignment of a capping head 110 with an underlying bottle B is ensured.

The upper and lower plates 120*a* and 120*b* are driven in rotation about the central axis A of the turret 102 by a motor (not shown) and drag with them the capping heads 110 and the bottles B.

Each capping head 110 is provided with a roller 130, which, during rotation of the capping head 110 about the central axis A, is constrained to roll in a cam profile 140 provided in the turret 102, thereby entraining in a vertical translational movement the capping head 110 to cause downward movement and subsequent upward movement thereof: for each revolution about the central axis A, the capping head 110 will carry out a translational downward movement in a vertical direction and then an upward movement until it returns to the starting point.

The capping head 110 of said capping machine 100 of known type for applying crown caps is shown in more detail in FIG. 2.

This capping head 110 consists essentially of a stationary (i.e., translationally fixed) part 111, which is mounted in the respective seat 122*a* of the supporting plate 122, and a movable part 112, which is rigidly connected to the roller 130 and therefore translates in the vertical direction according to the axial movement defined by the cam profile 140 at each revolution, sliding within the stationary part 111.

The movable part 112 is provided, at its lower end, with a crimping end 115 (cone) and slidably accommodates therein an ejector assembly 114, wherein the movable part 112 and the ejector assembly 114 together define a closing assembly 113 of the capping head 110.

Between the movable part 112 and the ejector group 114 there are arranged an ejector spring 116 and a pre-centering spring 117, which—together with the cam profile 140—control the relative translational movement between the ejector assembly 114 and the movable part 112 (and thus between the ejector assembly 114 and the crimping end), thereby controlling the various steps of the process of applying and crimping a crown cap.

The capping machine 100 and the capping head 110 shown so far are conventional ones in all respects and will therefore not be described in more detail. As is known, the interaction between the movement of the movable part and the various compression and decompression stages of the ejector spring 116 and the pre-centering spring 117 makes it possible for the capping head 110 to obtain, during operation of the capping head 110, at first the correct introduction of the crown cap into the closing assembly 113, then the application of the load onto the crown cap positioned on the bottle B to be capped, and finally the deformation of the serrations of the crown capsule (crimping) so that the crown cap becomes joined to the finish of the bottle B.

It is evident from the above that the movement of the capping head 110—in particular of the closing assembly 113—relative to the bottle B to be capped is a merely translational movement: in the case of crown caps, a relative rotational movement between the capping head and the container to be capped is unnecessary, and indeed detrimental.

On the other hand, in order to apply aluminum screw caps (ROPP) or pre-threaded caps to bottles or other containers, capping machines must be designed so that they can generate a rotation to tighten the cap on the mouth of the container and, at the same time, apply a compensating axial load necessary to firmly hold the container in place during the capping operation and to ensure contact between the threads of the cap and those of the container.

In other words, in the case of the application of aluminum screw caps or pre-threaded caps, a relative rotational movement of the capping head relative to the bottle or container to be capped is required.

An example of a known capping machine for applying aluminum screw caps or pre-threaded caps to bottles is shown in FIG. 3.

Said capping machine 200 for applying aluminum screw caps comprises a turret 202 and a plurality of capping heads 210, arranged circumferentially at regular intervals around a turret 202 (only a part of which is shown in FIG. 3 for simplicity of illustration).

The capping machine 200 comprises an upper plate 220*a* and a lower plate 220*b*, aligned with the turret 202 and having respective seats 222*a*, 222*b* arranged circumferentially at regular intervals and mutually aligned. The capping heads 210 are received in the seats 222*a* of the upper plate 220*a*, whereas the seats 222*b* of the lower plate 220*b* carry supports 224 for the respective bottles B, so that alignment of a capping head 110 with an underlying bottle B is ensured.

The upper and lower plates 220*a* and 220*b* are driven in rotation about the central axis A of the turret 202 by a motor (not shown) and drag with them the capping heads 201 and the bottles B.

Each capping head 210 is provided with a roller 230, which, during rotation of the capping head 210 about the central axis A, is constrained to roll in a cam profile 240 provided in the turret 202, thereby entraining in a vertical translational movement the capping head 210 to cause downward movement and subsequent upward movement thereof: for each revolution about the central axis A, the capping head 210 will carry out a translational downward movement in a vertical direction and then an upward movement until it returns to the starting point.

In addition to the rotation of the capping heads about the central axis A, it is necessary that each capping head 210 also rotates about its own axis L in order to obtain the relative rotation between the capping head and bottle and the rim of the cap.

To this purpose, the capping head 200 comprises a driving central sprocket 250 mounted on the turret 202 and meshing with a sprocket 252 mounted on the axis of the capping head 210.

Owing to the structure described above, rotation of the capping heads 210 about the central axis A at a first rotational speed can be controlled, and, for example by means of an electric actuator 260, also rotation of each capping head 210 about its own rotation axis L at a second rotational speed (different from the first rotational speed and determined by the transmission ratio between the sprockets 250, 252) can be controlled, thereby obtaining a planetary gear.

The capping head 210 of a capping machine 200 of known type for applying aluminum screw caps (ROPP) or pre-threaded caps is shown in more detail in FIG. 4.

Said capping head 210 comprises a piston in turn comprising a spindle 211 and a lifting rod 214 arranged inside the spindle 211.

The spindle 211 is connected to the sprocket 252, which, meshing with the central sprocket 250, allows the spindle 211 to rotate about its own axis L.

The spindle 211 is further connected to a fork 215 (visible in FIG. 3), which carries the roller 230, which, engaging with the cam profile 240, allows lifting and lowering the spindle 211 during revolution thereof about the axis A.

The lifting rod 214 carries at its upper end a second roller 216 which is mounted on the fork 215 and has an anti-rotation function. In addition, the second roller 216 can be used to cause a translational movement independent of the one of the fork 215 during revolution of the capping head 210 about the axis A.

A closing assembly 213 is removably connected to the capping head 210.

As the structure of the closing assembly 213 for aluminum screw caps (ROPP) or pre-threaded caps is the same as in prior art, a further detailed description of this structure will be omitted.

Suffice it to say that said closing assembly 213 is connected to the spindle 211, so that it is driven in rotation around the axis L together with said spindle and receives from it the translational movement component in the vertical direction during the revolution of the capping head about the central axis A; the closing assembly 213 further comprises a central rod 212 whose end is connected to the lifting rod 214.

Because of this combination of translational movement in the vertical direction and rotational movement about their own axes, the capping heads of the type described above are generally referred to as roto-translating heads.

Capping heads for applying crown caps of the known type described above have considerable limitations, as the closing assembly constitutes a large part of the capping head and has a considerable footprint (between 50 and 60 cm).

In the event of an application change, the entire capping head must be replaced, which makes such an application change complex and the corresponding timescales long.

Similar difficulties are encountered in case of maintenance or repair of the capping heads.

In the case of capping machines for applying aluminum screw caps or pre-threaded caps, the capping assembly has a small footprint (between 20 and 30 cm).

Furthermore, in the event of an application change, only the replacement of the closing assembly is required, which makes the operation easier and quicker.

However, capping machines for applying aluminum screw caps or pre-threaded caps are not in themselves usable for applying crown caps, since—as mentioned above—in the latter application a relative rotation of the capping head with respect to the bottle or container to be capped is detrimental.

In the field of capping machines, the need is therefore felt for greater flexibility, enabling the same capping machine to be used for the application of different types of capsules by means of correspondingly different types of closing assemblies. This flexibility of use should, however, be accompanied by the possibility of replacing these closing assemblies quickly and easily.

An object of the present invention is to overcome the limitations described above and meet the needs in the field, by providing a closing assembly for applying crown caps that is small in size and allows for easy and time-saving replacement in the event of an application change.

Another object of the present invention is to provide a versatile capping machine, on which it is possible to mount different types of closing assemblies, including in particular the above-mentioned closing assembly.

These and other objects are achieved by the closing assembly for applying crown caps and by the capping machine as claimed in the appended claims.

SUMMARY OF INVENTION

The invention relates to a closing assembly for applying crown caps that can be mounted on a capping head of a capping machine.

The closing assembly according to the invention can be mounted to capping heads that are structured and mounted to a corresponding capping machine in order to carry out solely a translational movement in the vertical direction, in particular a downward translation movement and a subsequent upward translational movement.

In addition, in order to be able to exploit the advantages of capping machines intended for applying aluminum screw caps or pre-threaded caps in terms of reduced footprint and ease and rapidity of operation also for the application of crown caps, the closing assembly according to the invention, although intended for the application of crown caps, is structured to be able to be mounted to roto-translating capping heads designed for the application of aluminum screw caps or pre-threaded caps.

Such roto-translating capping heads are structured and mounted to a corresponding capping machine in such a way that they not only move with a vertical translational movement, but also with a rotational movement around their own axis in order to achieve relative rotation between the capping head and container and the rim of the cap.

However, as is well known, in the case of application of crown caps, rotational movement is not necessary and may even be detrimental.

Therefore, the invention further relates to a capping machine equipped with one or more roto-translating capping heads that is able to control rotation of the capping heads about their own axes, even to the point of completely annulling such rotation.

Advantageously, when the closing assembly for applying crown caps according to the invention is mounted to the roto-translating heads of said capping machine, the rotational movement of the capping heads about their own axes is annulled, whereby said capping heads move solely in a translational movement.

Equally advantageously, when roto-translating capping heads carrying closing assemblies for applying aluminum screw caps or pre-threaded caps are installed on said capping machine, the rotational movement of the capping heads about their own axes is restored.

In summary, the capping machine according to the invention can handle both applications involving roto-translation of the capping heads and applications involving only translation of the capping heads.

Going into more detail, known closing assemblies for crown caps comprise a moving part, an ejector assembly and elastic ejector means arranged between the movable part and the ejector assembly.

In order to be able to install on a roto-translating capping head the closing assembly for applying crown caps according to the invention, said closing assembly comprises, besides the elements already described, an internal rod connected to the ejector assembly.

Such internal rod is apt, in use, to be connected to the lifting rod provided in the spindle of a roto-translating capping head.

According to a preferred embodiment of the invention, the internal rod of the closing assembly is connected to the lifting rod of the capping head by means of an anti-rotation coupling.

Said anti-rotation coupling can be, for example, a square coupling or, more generally, a coupling with polygonal cross-section.

As the lifting rod of the spindle does not rotate together with the spindle, and as the connection between the lifting rod and the internal rod of the closing assembly is made as an anti-rotation coupling, it is possible to prevent rotation of the ejector assembly of the closing assembly.

However, it is also necessary to avoid rotation of the movable part of the closing assembly, which, in use, is in contact with the rotating spindle: if the spindle transferred its own rotational movement to the movable part of the closing assembly, the risk of non-optimal application of the crown cap would arise.

As mentioned above, known capping machines equipped with roto-translating capping heads comprise a gear system including a fixed central sprocket, mounted to the turret of the capping machine and meshing with a sprocket mounted to the axis of the capping head, allowing the electric actuator to control revolution of the capping head about the central axis of the turret at a first rotational speed and rotation of each capping head about its own rotation axis at a second rotational speed different from the first one.

According to the invention, the capping machine has a gear system in which the central sprocket is not fixed, but rotatable about the central axis of the turret of the capping machine, and the rotational speed thereof can be controlled, for example by means of an electric actuator.

In particular, by acting onto such electric actuator, it is possible to adjust the rotational speed of the central sprocket so that said speed corresponds to the rotational speed of the upper plate entraining in rotation the capping heads. In this way, as the central sprocket and the upper plate rotate at the same speed, the sprocket mounted to the axis of the capping head and the central sprocket rotate as a single rigid body about the central axis of the turret.

This means that, during rotation of the capping heads about the central axis of the turret, there is no rotation of each capping head about its own axis.

Therefore, during operation of the capping machine, the spindle of the capping head, due to the fact that it does not rotate, does not transfer any rotation to the closing assembly connected thereto, and it transfers only the translational movement in the vertical direction, thereby ensuring optimal application of the crown cap to the container.

Also, with a view to being able to mount the closing assembly according to the invention to capping machines intended for the application of aluminum screw caps or pre-threaded caps, according to a preferred embodiment of the invention said closing assembly has a significantly small footprint, comparable to that of known closing assemblies for pre-threaded caps or aluminum screw caps (i.e., between 20 and 30 cm).

According to a preferred embodiment of the invention, in order to achieve such small footprint, the movement of the ejector assembly of the closing assembly relative to the movable part of said closing assembly is made possible by two or more ejector springs that are concentric and mounted parallel to each other (rather than by a single ejector spring).

Preferably, said ejector springs extend around the ejector assembly of the closing assembly. In addition, said ejector springs are arranged between the surface of a first annular flange associated with a first upper end of the ejector assembly and the surface of a second annular flange associated with a second lower end of the ejector assembly and opposite to the first annual flange.

More preferably, the ejector springs are arranged in such a way as to be radially farther from the capping head axis of than the ejector assembly and radially nearer to the capping head axis than the movable part of the closing assembly. Even more preferably, the ejector springs are arranged concentrically to the ejector assembly and the movable part so as to obtain the following radial arrangement starting from the axis of the capping head: ejector assembly, ejector springs, movable part.

The presence of more springs arranged in parallel makes it possible to reduce the longitudinal dimensions of the movable part and the ejector assembly and, consequently, to remarkably reduce the overall dimensions of the closing assembly according to the invention, thereby obtaining an overall footprint comparable to that of the closing assemblies for applying aluminum screw caps or pre-threaded caps.

BRIEF DESCRIPTION OF DRAWINGS

Further features and advantages of the present invention will become more evident from the ensuing detailed description of some preferred embodiments of the invention, given by way of non-limiting examples with reference to the annexed drawings, in which.

DESCRIPTION OF EMBODIMENTS

In the following description of some preferred embodiments of a closing assembly according to the invention, reference will be made to a closing assembly for applying crown caps to bottles, said closing assembly being mounted to a roto-translating capping head of known type.

However, said embodiments should not be intended as limiting, and the closing assembly according to the invention could be used for different applications and/or for capping containers of various shapes and dimensions, not only bottles.

Furthermore, the closing assembly according to the invention could be mounted to capping heads that are movable only in a translational movement in the vertical direction.

The capping head according to the invention is shown with a closing assembly according to the invention for applying crown caps to bottles; however, it could also be used for applying other types of caps, such as aluminum screw caps or pre-threaded caps, and/or for capping other containers.

Figure 5:
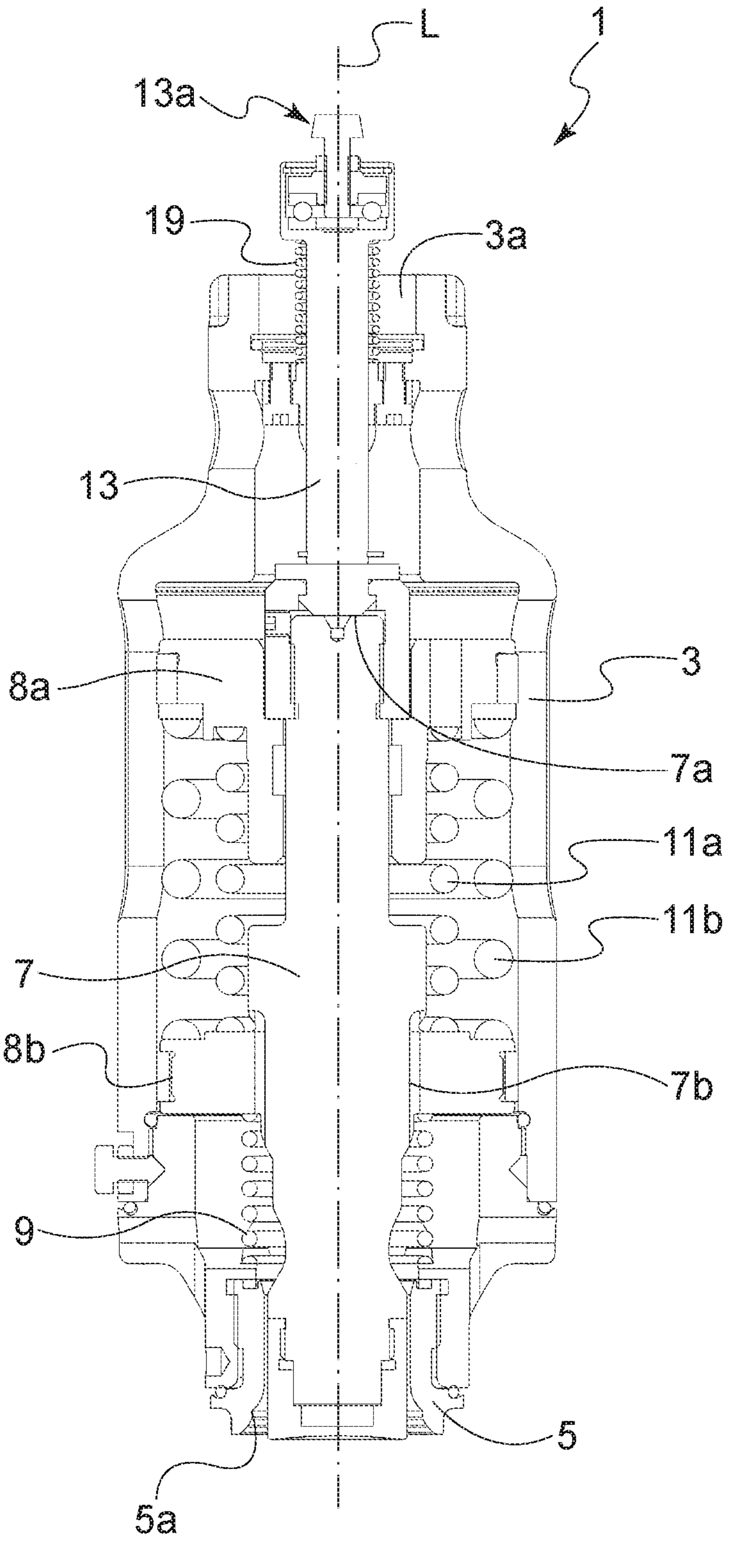
FIG. 5 shows a closing assembly according to a first embodiment of the present invention.

FIG. 5 shows a first preferred embodiment of the closing assembly for applying crown caps according to the present invention.

Said closing assembly 1 comprises a hollow movable part 3 having a substantially cylindrical shape.

The lower end of the movable part 3 is open and a crimping end 5 (cone) rigidly connected to said movable part 3 is provided at said lower end of said movable part 3.

The crimping end 5 comprises a seat 5*a*, which, during operation of the capping machine, receives the crown cap to be applied to the neck of the bottle to be capped and enters into direct contact with said crown cap.

In a manner known per se, an ejector assembly 7 is housed within the movable part 3.

The ejector assembly 7 is made as a substantially cylindrical body (usually mounted concentrically to the movable part 3) and ends at its bottom with a substantially flat abutment surface 7*a*, which, during operation of the capping machine, comes into contact with the crown cap and applies a load thereon.

Pre-centering elastic means are provided between the ejector assembly 7 and the movable part 3 of the closing assembly 1; in particular, in the illustrated embodiment, said pre-centering elastic means comprise a pre-centering spring 9.

During operation of the capping head, the decompression of the pre-centering spring 9 allows moving the ejector assembly 7 upwards relative to the movable part 3, thereby making it possible to restore the free stroke of the ejector assembly relative to said movable part and allowing insertion of the crown cap to be applied into the seat 5*a* of the crimping end 5.

In addition, elastic ejector means are provided between the ejector assembly 7 and the movable part 3 of the closing assembly 1.

The elastic means, too, contribute to the relative translational movement in the vertical direction between the ejector assembly 7 and the movable part 3, but, unlike the pre-centering spring 9, during operation of the capping head the decompression of the elastic ejector means allows the movable part 3 and crimping end 5 to lower down onto the bottle neck allowing the serrations of the cap to become deformed (crimped) on the bottle finish.

Advantageously, in the illustrated embodiment the elastic ejector means comprise a pair of ejector springs, 11*a* and 11*b*, concentric to each other and mounted in parallel.

Here below, the term "upper" is used to indicate a distal position relative to the crimping end 5, whereas the term "lower" defines a proximal position relative to the crimping end 5.

In the illustrated embodiment, the ejector springs 11*a*, 11*b* extend around the ejector assembly 7 of the closing assembly 1. Furthermore, the ejector springs 11*a*, 11*b* are arranged between the surface of a first annular flange 8*a* associated with a first upper end 7*a* of the ejector assembly 7 and the surface of a second annular flange 8*b* associated near a second lower end 7*b* of the ejector assembly 7 and opposite to the first annular flange 8*a*.

As can be seen from the figures, the ejector springs 11*a*, 11*b* are arranged in such a way as to be radially farther from the capping head axis "L" than the ejector assembly 7 and radially nearer to the capping head axis "L" than the movable part 3 of the closing assembly 1. In the illustrated embodiment, the ejector springs 11*a*, 11*b* are arranged concentrically to the ejector assembly 7 and the movable part 3, in such a way as to obtain the following radial arrangement starting from the capping head axis "L": ejector assembly 7, ejector springs 11*a*, 11*b*, movable part 3.

Said combination of ejector springs 11*a*, 11*b* allows remarkably reducing the dimensions in the axial direction (i.e., along the symmetry axis L) of the movable part 3 and the ejector assembly 7 compared to those used in known closing assemblies for applying crown caps.

For example, it is possible to go from a longitudinal footprint generally between 50 and 60 cm to a longitudinal footprint between 20 and 30 cm.

Therefore, the overall footprint of the closing assembly 1 according to the invention is remarkably reduced, becoming comparable to that of closing assemblies for applying aluminum screw caps or pre-threaded caps of known type.

The small dimensions of the closing assembly 1 according to the invention make it possible, in the event of an application change (or also in case of maintenance or repair), to replace said assembly in an easier and faster manner.

Also in view of its small dimensions, which are comparable to the dimensions of the closing assemblies for applying aluminum screw caps or pre-threaded caps of known type, the closing assembly 1 according to the invention, the closing assembly 1 according to the invention is also suitable for mounting on roto-translating capping heads.

For this purpose, the ejector assembly 7 is provided at its top with a central internal rod 13 which protrudes from the movable part 3 through a through hole 3*a* formed therein and is provided with coupling means 13*a* that are adapted to cooperate with corresponding coupling means of a lifting rod of a roto-translating capping head.

In the illustrated embodiment, the coupling means 13*a* are provided on the upper end 12 of the internal rod 13, i.e., on the distal end relative to the crimping end 5 when the closing assembly 1 is installed on the capping head 210. The internal rod 13 is provided with a support spring 19, whose decompression allows, during the capping process, keeping the coupling means 13*a* of the internal rod 13 in contact with the corresponding coupling means of a lifting rod of a roto-translating capping head and pushing upwards the assembly formed by said internal rod and said lifting rod.

Preferably, the coupling means 13*a* are apt to form an anti-rotation coupling with the corresponding coupling means of a lifting rod of a roto-translating capping head, so that rotation of the ejector assembly 7 is prevented.

Figure 1:
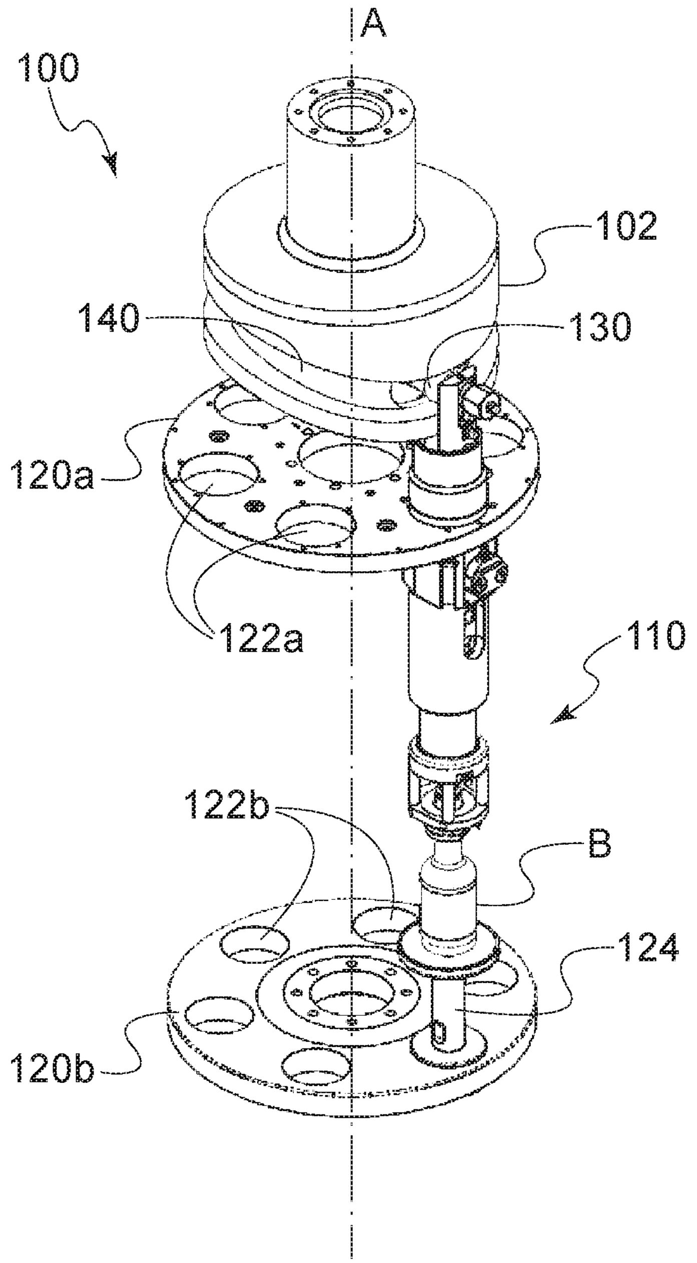
Fig. 1 (PRIOR ART)
FIG. 1 shows a capping machine for applying crown caps according to prior art.
Figure 2:
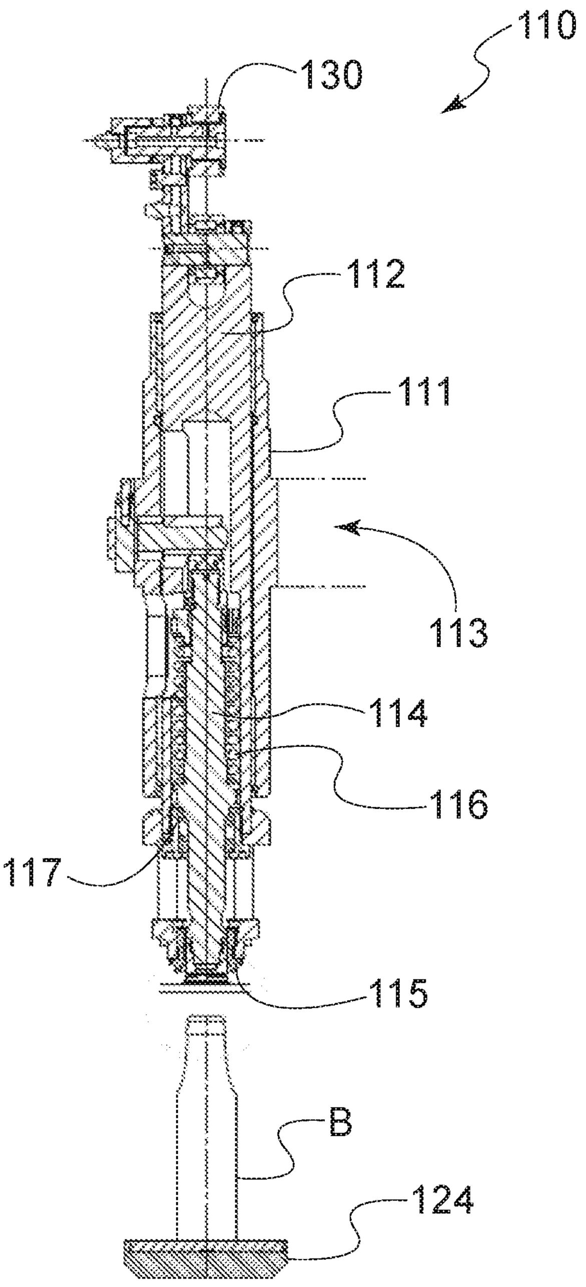
Fig. 2 (PRIOR ART)
FIG. 2 shows a capping head for applying crown caps according to prior art.
Figure 3:
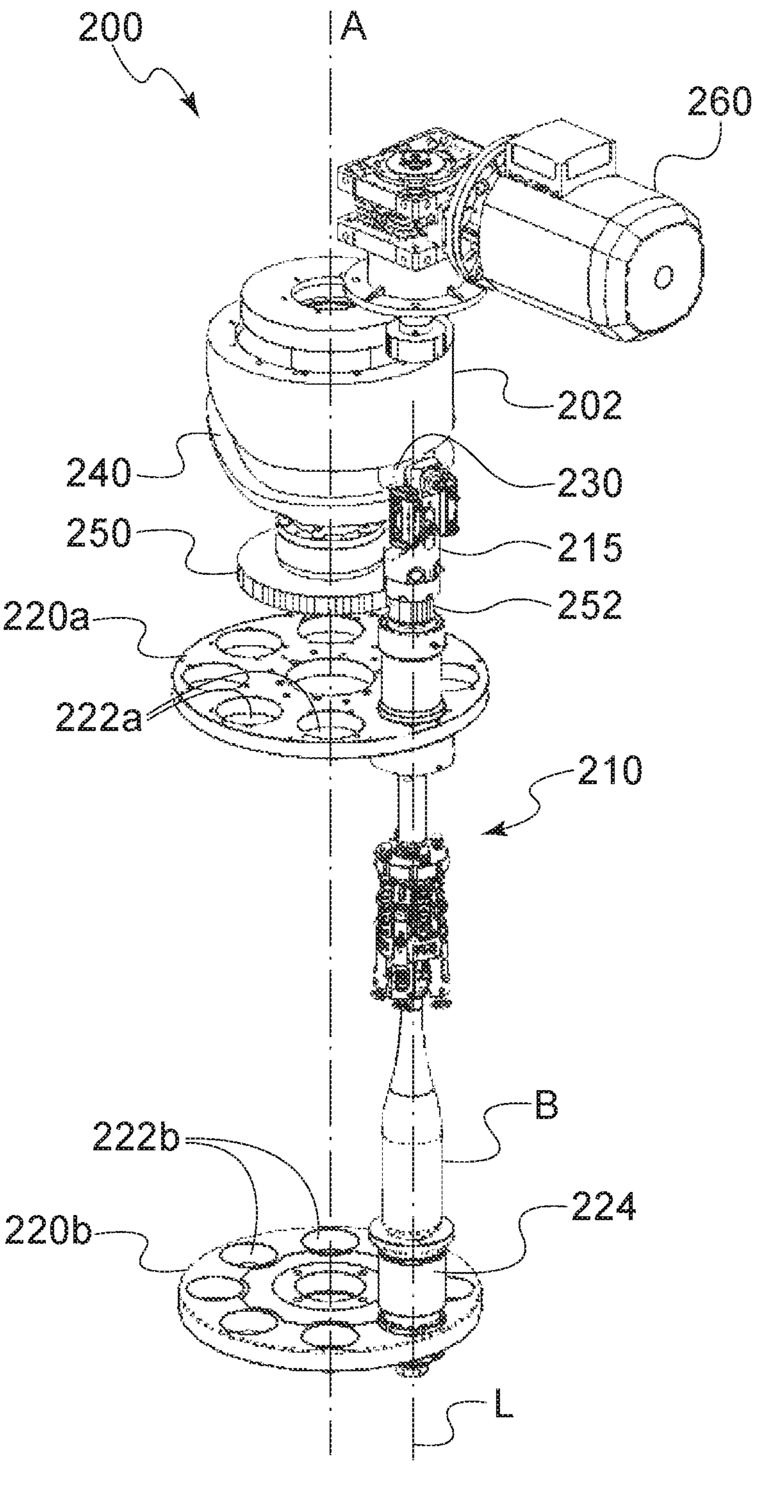
Fig. 3 (PRIOR ART)
FIG. 3 shows a capping machine for applying aluminum screw caps according to prior art.
Figure 4:
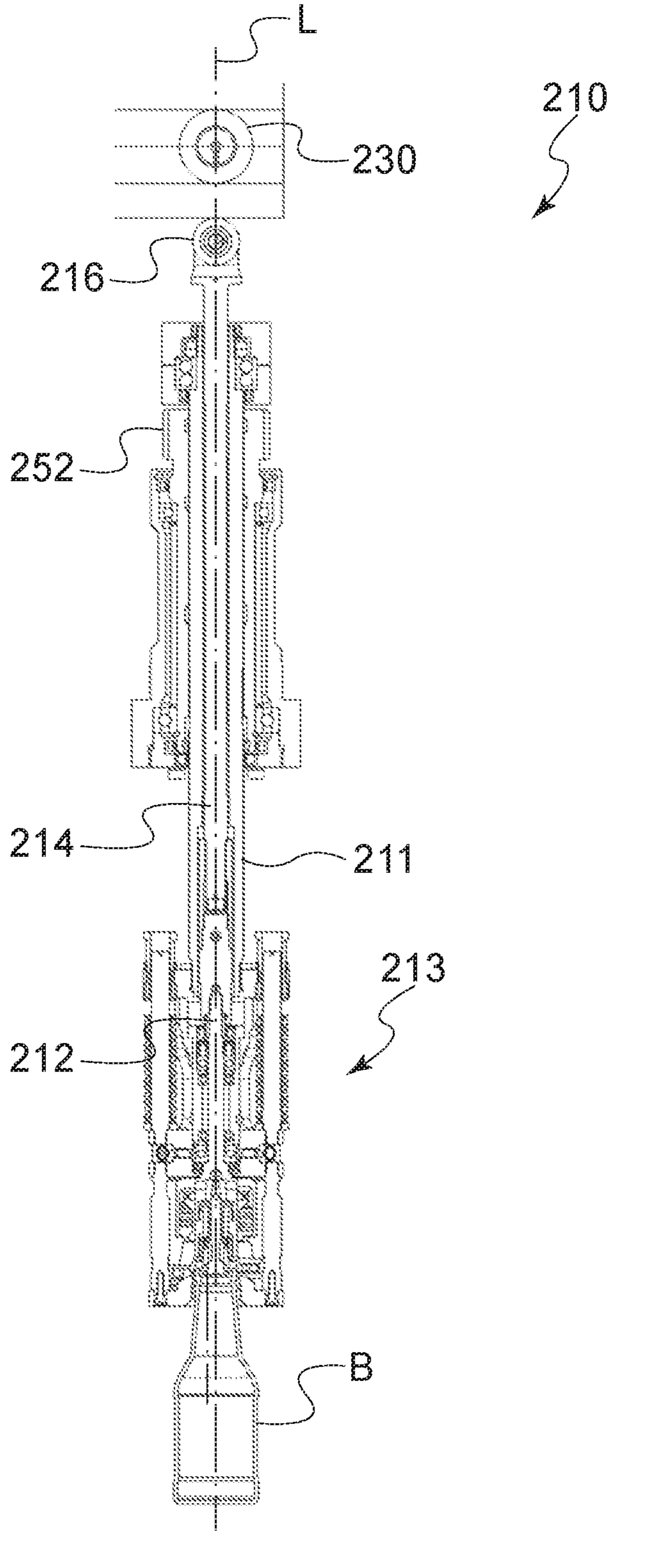
Fig. 4 (PRIOR ART)
FIG. 4 shows a capping head for applying aluminum screw caps according to prior art.
Figure 6:
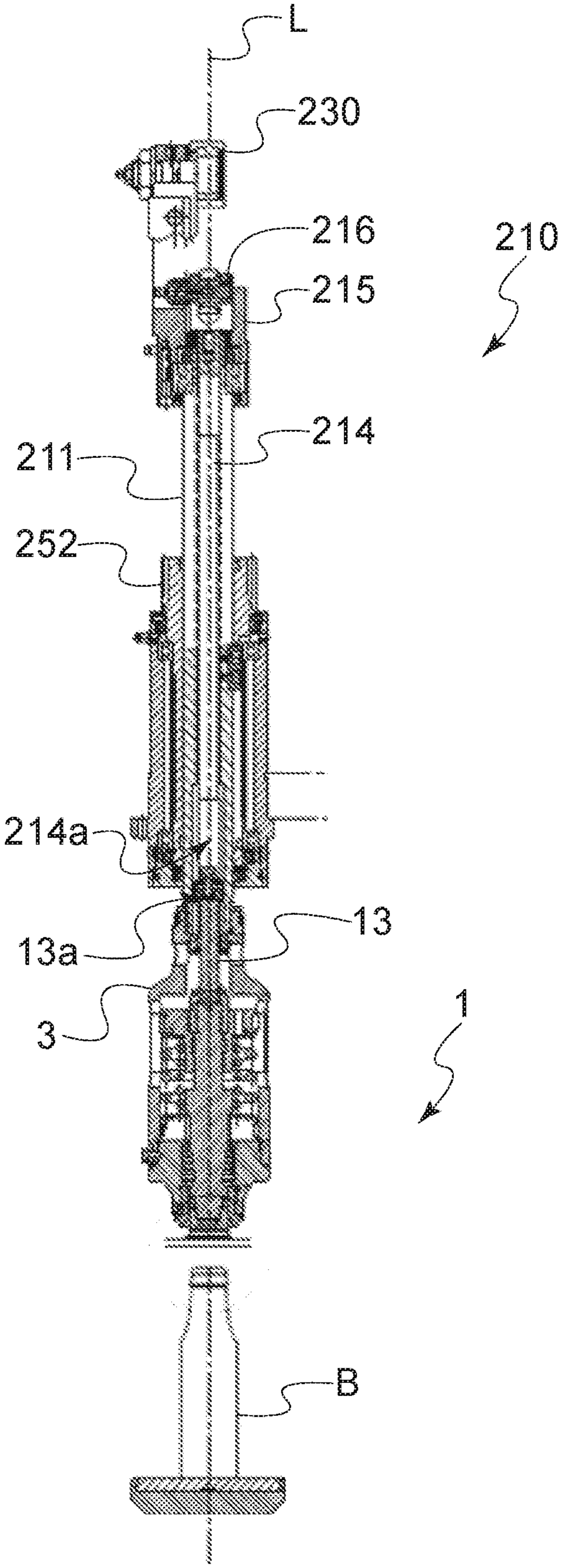
FIG. 6 shows a roto-translating capping head of known type to which the closing assembly of FIG. 5 is mounted.

To better clarify the above, in FIG. 6 the closing assembly 1 according to the first embodiment of the invention is shown mounted to a roto-translating capping head 210 of the type known and illustrated in FIG. 4.

As mentioned above, said capping head 210 comprises a piston which in turn comprises a spindle 211 and a lifting rod 214 and to whose lower end the closing assembly 1 described in FIG. 5 is removably fixed.

In a manner known per se, the spindle 211 is connected through a fork 215 to a roller 230 which, engaging with a cam profile, makes it possible to raise and lower said spindle 211 during rotation of the capping head.

The lifting rod 214 carries at its upper end a second roller 216 which is mounted to the fork 215 and has an anti-rotation function. The second roller 216 can also have the function of causing a translational movement independent of that of the roller 230 and the spindle 211 during rotation of the capping head 210 about the central axis of the turret of the capping machine.

Coupling means 214*a* are provided at the lower end of the lifting rod 214, said coupling means cooperating with the coupling means 13*a* of the internal rod 13 of the closing assembly 1 to form a coupling, preferably an anti-rotation coupling, between said lifting rod and said closing assembly.

As mentioned above, the internal rod 13 is preferably connected to the lifting rod 214 of the capping head 210 by means of an anti-rotation coupling, such as a coupling with polygonal cross-section (a square coupling in the example shown in the Figures).

The lifting rod 214, not being entrained in rotation by the spindle 211 by virtue of the second roller 216, can move only in a translational movement in the vertical direction (determined by the path of said second roller 216).

Therefore, as the internal rod 13 is connected to the lifting rod 214 by means of a square coupling, the internal rod 13 also moves only in a translational movement.

Furthermore, the ejector assembly 7 is connected to the internal rod 13 and therefore the movement of the ejector assembly 7 also has only the vertical translational movement component.

The mounting of the closing assembly 1 to the roto-translating capping head 210 is also obtained by connecting the spindle 211 of said capping head 210 to the movable part 3 of said closing assembly 1.

In a manner known per se, a sprocket 252 is connected to the spindle 211. If said sprocket 252 meshed with the driving gear of a capping machine of known type, this would allow the spindle 211 to rotate about its own axis L.

However, if the spindle 211 were rotated about said axis, as the spindle 211 is connected to the movable part 3 of the closing assembly 1, the movable part 3 (and with it the crimping end) would also rotate.

However, it should be considered that relative rotational movements between the closing assembly and the bottle to be capped should be avoided during application of a crown cap.

Consequently, it is recommendable that the rotational movement of the spindle of a roto-translating capping head be not transmitted to the ejector assembly or crimping end.

Therefore, when the closing assembly 1 according to the invention is mounted to the capping head 210, it is recommendable to lock the rotation of said capping head about the axis L in such a way that it cannot transfer this rotation to the clamping unit 1.

In this respect, the invention further relates to a capping machine that can annul the rotation of the capping head 210 so that optimal application of the crown caps is allowed.

Figure 7:
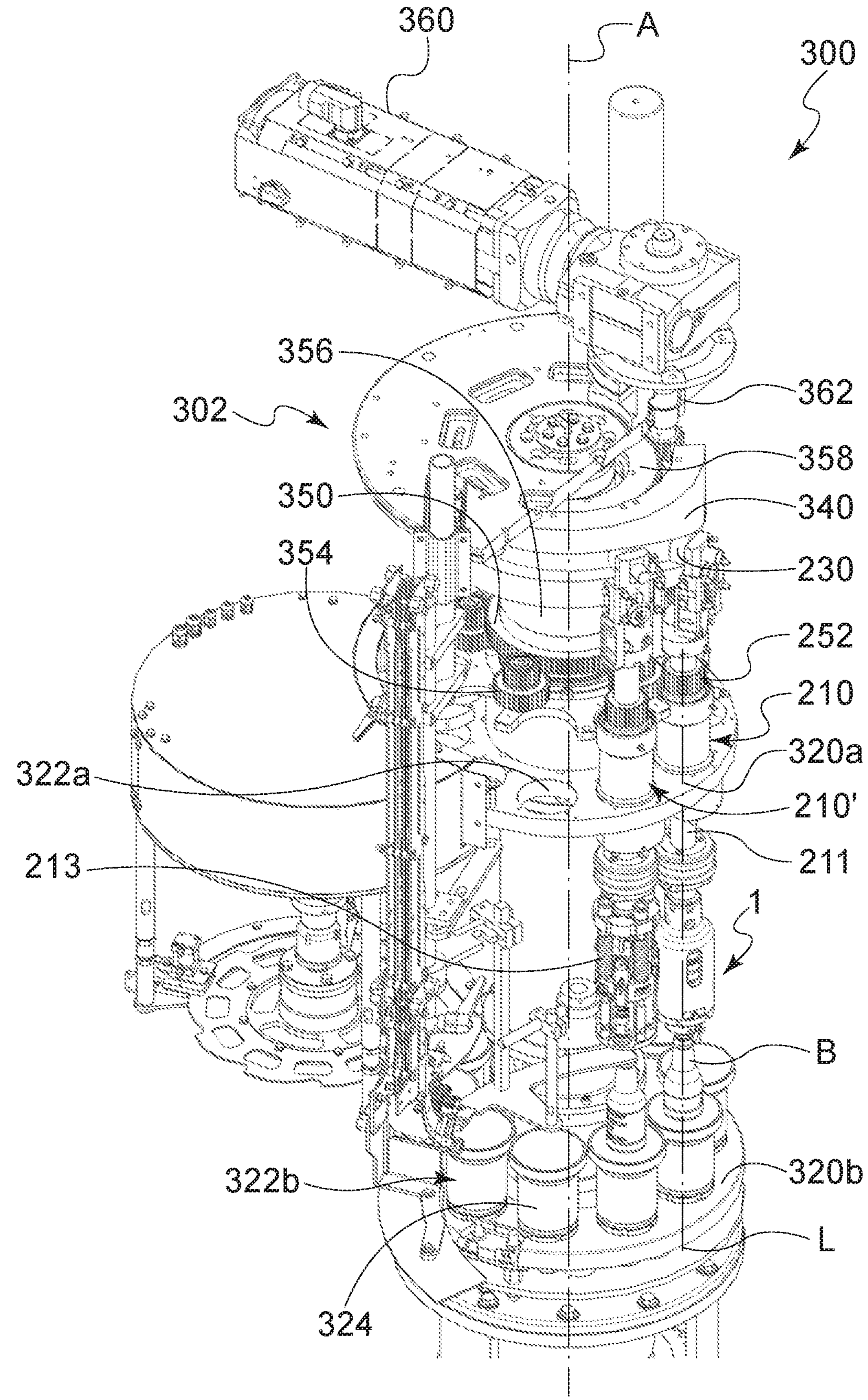
FIG. 7 shows a capping machine according to the present invention to which a roto-translating head of known type carrying the closing assembly of FIG. 5 is mounted.

Said capping machine is described in more detail in FIG. 7.

Indeed, FIG. 7 shows a first preferred embodiment of the invention in which the roto-translating capping head 210, on which the closing assembly 1 for applying crown caps is installed, is mounted to a capping machine 300 according to the invention.

Said capping machine 300 comprises a turret 302 and a plurality of capping heads 210 arranged circumferentially around a turret 302 at regular intervals (only one of said capping heads being shown in FIG. 7 for simplicity of illustration).

The capping machine 300 comprises an upper plate 320*a* and a lower plate 320*b* which are aligned to the turret 302 and have respective seats 322*a*, 322*b* which are arranged circumferentially at regular intervals and aligned to one another. The capping heads 210 are accommodated in the seats 322*a* of the upper plate 320*a*, whereas the seats 322*b* of the lower plate 320*b* carry supports 324 for respective bottles, whereby alignment of a capping head 210 with an underlying bottle B is ensured.

The upper and lower plates 320*a* and 320*b* are driven to rotate about the central axis A of the turret 302 and drag with them the capping heads 210 and the bottles B.

Each capping head 210 is provided with a roller 230 which, during rotation of the capping head 210 about the central axis A, is constrained to roll in a cam profile 340 formed in the turret 302, entraining in vertical translation the capping head 210 to cause downward and subsequent upward movement thereof: for each revolution about the central axis A, the capping head 210 will carry out a translational movement downwards in the vertical direction and then upwards until it returns to its starting point.

Said capping machine 300 further comprises a gear system extending through the turret 302, between an electric actuator 360 and the capping heads 210.

Said gear system comprises in particular a central driving sprocket 350 which, through a gear train 354, meshes with the sprocket 252 mounted on the axis of the capping head 210.

It should be noted that, in an alternative embodiment of the invention, the central sprocket 350 could mesh directly with the sprocket 252 mounted on the axis of the capping head 210.

In currently existing capping machines employed for using roto-translating capping heads, the central driving sprocket is fixed and the electric actuator, by controlling rotation of the upper plate, generates a relative rotation between the driving sprocket and the capping head sprocket, causing the latter (and thus the whole capping head) to rotate about itself while rotating around the driving sprocket.

In the capping machine 300 according to the invention, instead, the central driving sprocket 350 is not fixed, but the machine 300 comprises an adjustment system for adjusting the rotational speed of said central sprocket 350.

In a preferred embodiment of the invention, said adjustment system is controlled by an electric motor 360.

For this purpose, the central sprocket 350 is mounted at a first end or lower end of a cylindrical flange 356, which is rotatably mounted about the central axis A of the turret 302.

At the opposite second end or upper end, the cylindrical flange 356 is provided with a second crown gear 358 meshing with the output shaft 362 of the electric motor 360 (which in turn is provided with a corresponding gear).

Therefore, when on the capping machine 300 there is mounted the capping head 210 on which the closing assembly 1 for applying crown caps has been installed, the electric motor 360 adjusts the rotational speed of the central driving sprocket 350.

In particular, the electric motor 360 adjusts the rotational speed of the central sprocket 350 so that said speed coincides with the rotational speed of the upper plate 320*a*.

In this way, as the central sprocket 350 and the upper plate 320*a* rotate at the same speed about the axis A, the central sprocket 350, the gear train 354 (where provided) and the sprocket 252 rotate as a single rigid body, without generating the rotational movement component about the axis L.

This means that, during rotation of the capping head 210 about the central axis A (which, in association with the presence of the cam profile 340, leads to the vertical translation of the capping head), there is no rotation of each capping head about its own axis.

Therefore, during operation of the capping machine 300, by appropriately adjusting the rotational speed of the central sprocket 350, only the vertical translational movement of the capping heads 210 can be kept.

Accordingly, the spindle 211 of the capping head 210, due to the fact that it does not rotate, does not transfer any rotation to the closing assembly 1 connected thereto.

In particular, no rotational movement is transferred from the spindle 211 to the components of the closing assembly 1 which interact with the bottle during the capping process (movable part 3 with crimping end 5 and ejector assembly 7), which components will move solely in a translational movement in the vertical direction, thereby allowing optimal application of the crown cap to the bottle.

By way of comparison only, FIG. 7 also shows a capping head 210' carrying a closing assembly 213 of known type for applying aluminum screw caps.

Advantageously, when roto-translating capping heads carrying closing assemblies 213 for applying aluminum screw caps or pre-threaded caps are installed on the capping machine 300, the electric motor 360 can again adjust the rotational speed of the central sprocket, stopping it or bringing it to a rotational speed other than that of the upper plate 320*a*, so as to restore the rotational movement of the capping heads about the axis L.

In summary, the capping machine 300 can handle both applications involving roto-translation of the capping heads (application of aluminum screw caps and pre-threaded caps) and applications involving only translation of the capping heads (application of crown caps).

Still referring to FIG. 7, thanks to the small footprint of the closing assembly 1 according to the invention compared to that of known closing assemblies for applying crown caps, the dimensions of said closing assembly 1 are quite similar to those of the closing assembly 213 of known type for applying aluminum screw caps.

Figure 8:
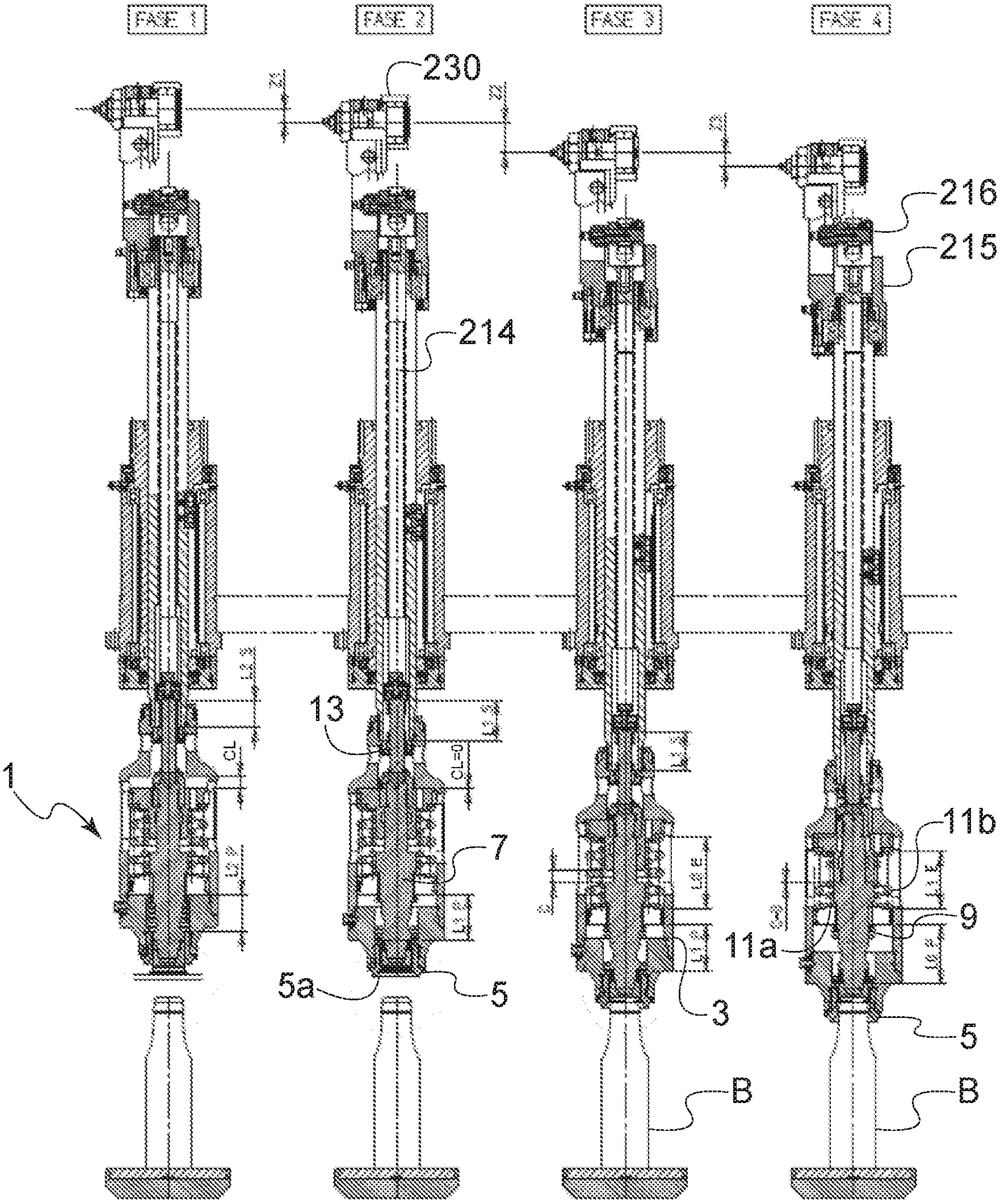
FIG. 8 shows the capping steps carried out by a capping head to which the closing assembly of FIG. 5 is mounted.
Figure 9:
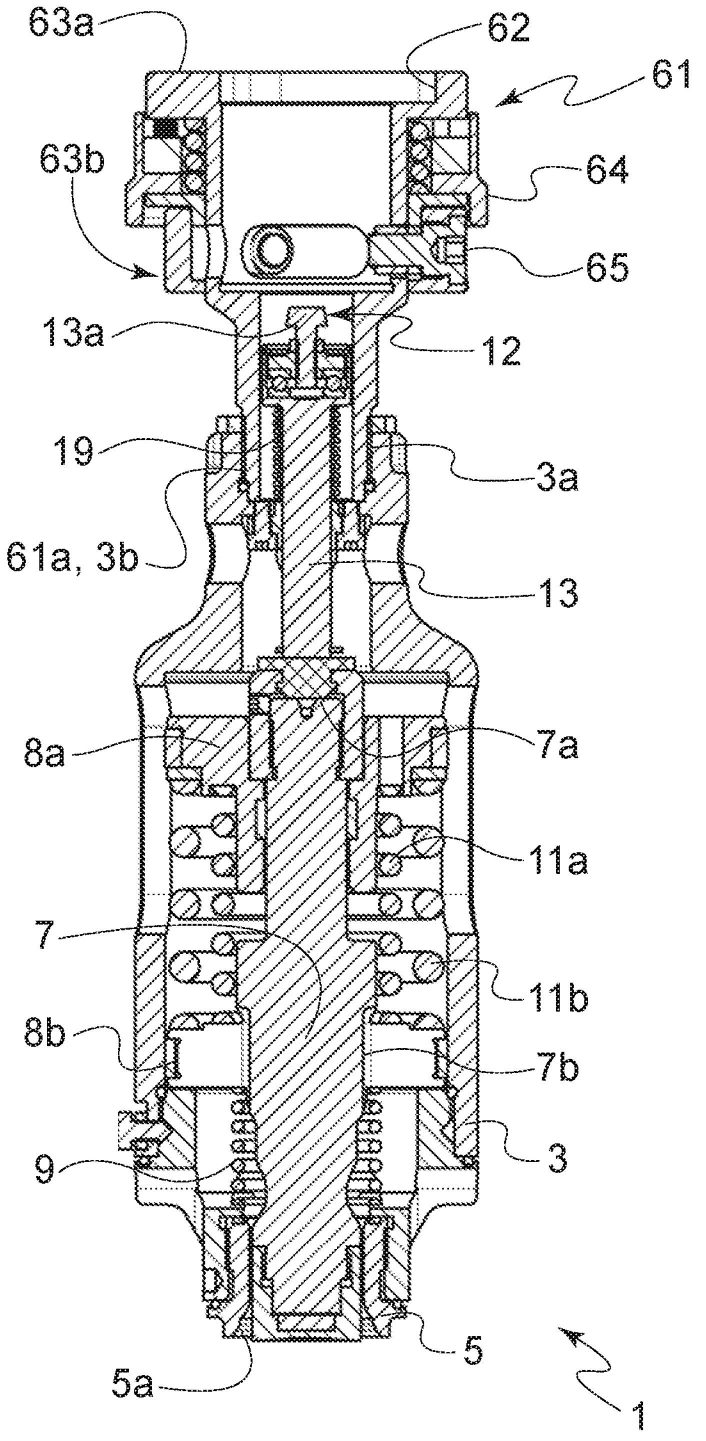
FIG. 9 shows a closing assembly according to a second embodiment of the present invention.
Figure 10:
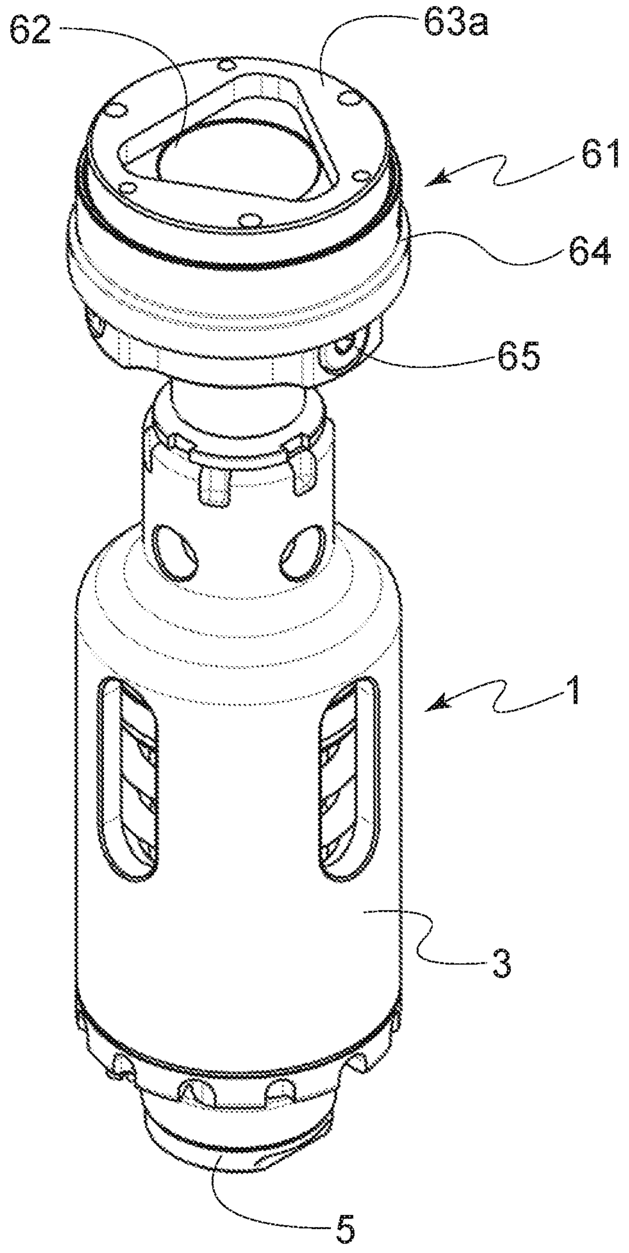
FIG. 10 is a perspective top view of the closing assembly of FIG. 9.
Figure 11:
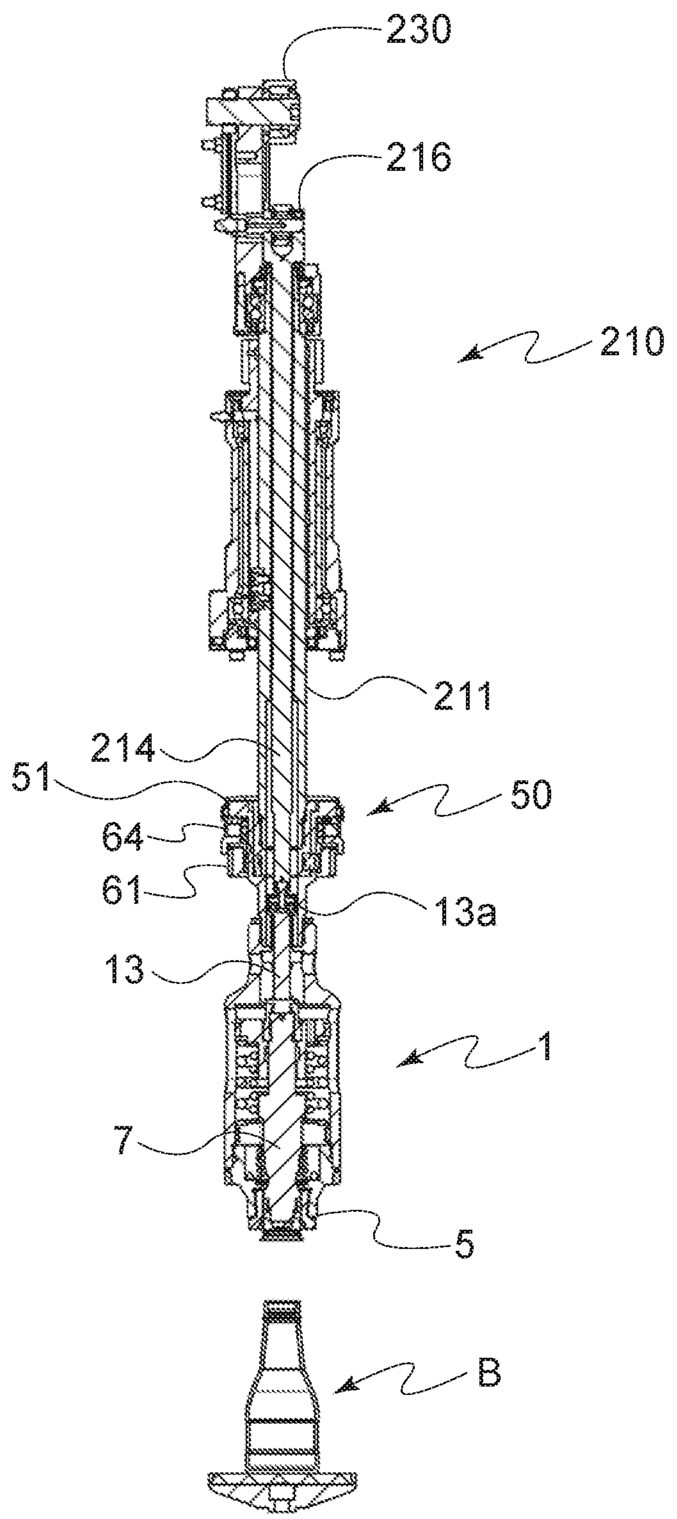
FIG. 11 shows a roto-translating capping head of known type on which the closing assembly of FIG. 9 is installed.
Figure 12:
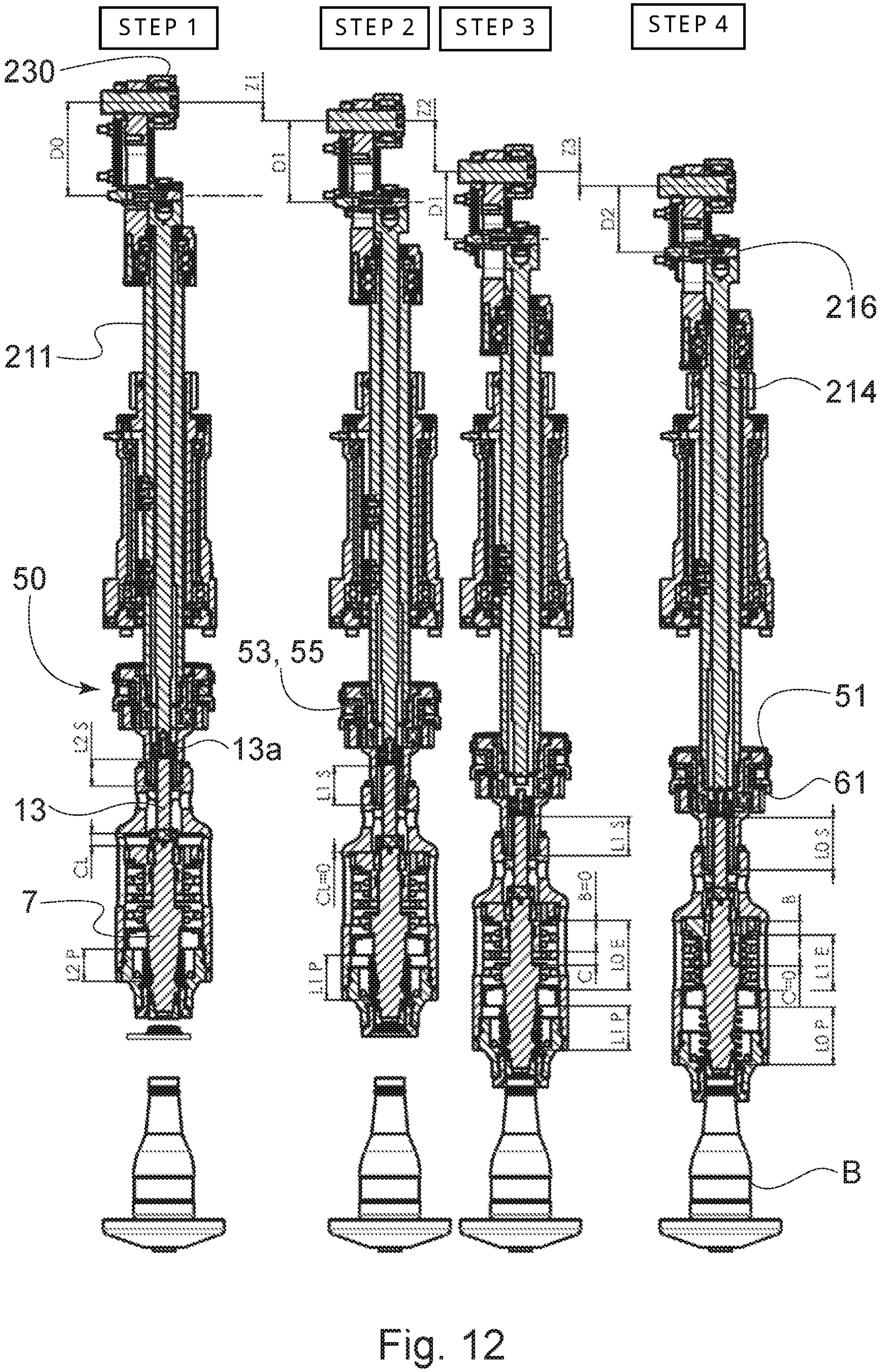
FIG. 12 shows the capping steps carried out by a capping head to which the closing assembly of FIG. 9 is mounted.

In the following, with reference to FIG. 8, the operation of the capping head 210 and the closing assembly 1 according to the present embodiment of the invention connected to said capping head will be briefly summarized.

Starting from the condition in which the closing assembly 1 has already picked up the cap from a distribution device (not shown), after the stroke Z1, thanks to the independent control of the internal rod 13 and the decompression of the pre-centering spring 9 from L2P to L1P, the free stroke CL of the ejector assembly 7 is zeroed, thus allowing correct insertion of the cap into the seat 5*a* of the crimping end 5. Meanwhile, the support spring 19 of the internal rod 13, decompressing from L2S to L1S, allows pushing upwards the internal rod 13 and the lifting rod 214 connected thereto, thereby allowing the second roller 216 located at the upper end of the lifting rod 214 to be kept in the correct position.

Subsequently, during the stroke Z2, the movable part 3 together with the cap catches the bottle B.

Finally, during the stroke Z3, thanks to the reaction of the bottle B, some load resulting from the compression of the ejector springs 11*a* and 11*b* from L0E to L1E (closing stroke C) is applied onto the cap. At the same time, the crimping end 5 lowers, inserts itself into the finish of the bottle and deforms the serrations of the cap (crimping), thereby making the cap joined with the bottle B. The pre-centering spring 9 further decompresses, moving to L0P.

It should be noted that the strokes Z1, Z2 and Z3 of the movable part 3 are due to the fact that the capping head 210 is entrained in vertical rotation by the roller 230 rolling over the profile of the cam.

Referring to FIGS. 9-12, these illustrate a second embodiment of the closing assembly according to the invention, a capping head of known type carrying said closing assembly, as well as the capping steps carried out by a capping head to which the closing assembly is mounted.

In FIGS. 9-12, the same reference numbers have been used to distinguish components that are the same as or functionally equivalent to those illustrated in the first embodiment described above.

The second preferred embodiment of the invention differs from the first embodiment in that it comprises a connecting device 50 for the quick fastening of the closing assembly 1 to the capping head 210.

For simplicity of description, reference will be made in the following mainly to the connecting device 50 with which the 210 capping head is equipped, without repeating the part of the description relating to the closing device 1, capping head 210, capping machine 300 and capping stages, as these have been described in detail above.

The connecting device 50 is provided between the spindle 211 of the piston of the capping head 210 and the closing assembly 1.

Advantageously, the connecting device 50 provided on the capping head 210 allows facilitating the operations of hooking and/or releasing the closing assembly 1 relative to the capping head 210.

As can be seen from FIGS. 9-12, the connecting device 50 comprises a first element 51 associated with the lower end 211*a* of the spindle 211 of the piston of the capping head 210 and a second element 61 associated with an upper end 1*a* of the closing assembly 1. In the illustrated embodiment, the second element 61 is associated with the closing assembly 1 by means of corresponding threads 61*a* and 3*b* provided at the lower end of the second element 61 and the upper end 1*a* of the closing assembly 1, respectively.

The first element 51 and second element 61 of the connecting device 50 cooperate with each other and are shaped so as to allow quick fixing of the closing assembly 1 to the spindle 211 of the piston of the capping head 210.

In the illustrated embodiment, the first element 51 of the connecting device 50 comprises a first sleeve having an end portion 53 provided with first fixing elements 55. The second element 61 of the connecting device 50 in turn comprises a second sleeve and a locking ring 64 allowing associating said second element 61 with the first element 51 of the connecting device 50 so that said second element 61 is movable relative to said first element 51. The second element 61 of the connecting device comprises a first end portion 63*a* on which an anti-rotation coupling 62 is defined, provided between the first element 51 and the second element 61 of the connecting device 50, and a second end portion 63*b* comprising second fixing means 65. Said first 55 and second 65 fixing means are complementary to and cooperating with each other in order to facilitate the operations of fixing, i.e., the operations of locking and/or unlocking, the closing assembly 1 on the capping head 210.

In the illustrated embodiment, said first fixing means 55 comprise corresponding slots provided on the end portion 53 of the first element 51 of the connecting device 50 and said second fixing means 65 comprise corresponding locking pegs apt to cooperate with said slots to allow the operations of hooking and/or releasing the closing assembly 1 on/from the capping head 210.

Referring to the operation of the connecting device 50, in order to release the closing assembly 1 from the capping head 210 it is necessary to lift the locking ring 64 and, thereafter, to rotate said locking ring 64 so that the locking pegs 65 are at an open portion in which they come out of the slots 55 so as to allow the second element 61 to be separated from the first element 51 of the connecting device 50.

It is evident from the above that the closing assembly for applying crown caps and the capping machine according to the invention have remarkable advantages over the closing assemblies and capping machines of known type, as they allow quick and easy removal and replacement, if required, of the closing assembly and allow handling both applications involving roto-translation of the capping heads and applications involving only translation of the capping heads, by using a same capping machine, by mere replacement of the closing assembly and adjustment by the electric actuator.

It is further evident that the embodiments described above have been given merely by way of examples and that several variations and modifications are possible without thereby departing from the scope of protection of the invention as defined by the appended claims.

The invention claimed is:

1. A closing assembly (1) for capping heads for a capping machine, the closing assembly comprising a movable part (3) which is provided, at a lower end thereof, with a crimping end (5) and which in turn houses an ejector assembly (7), wherein said ejector assembly (7) is slidable with respect to said movable part (3) and elastic ejector means (11*a*, 11*b*) are arranged between said movable part (3) and said ejector assembly (7), wherein said ejector assembly (7) is connected to an internal rod (13) which protrudes from said movable part (3) and is provided with coupling means (13*a*) and wherein said elastic ejector means comprise two or more concentric ejector springs (11*a*, 11*b*), which are arranged in parallel.

2. The closing assembly (1) according to claim 1, wherein said coupling means (13*a*) of said internal rod (13) are anti-rotation coupling means.

3. The closing assembly (1) according to claim 2, wherein said coupling means (13*a*) are made in the form of a polygonal coupling.

4. The closing assembly (1) according to claim 3, wherein said coupling means (13*a*) is made in the form of a square coupling.

5. The closing assembly (1) according to claim 1, wherein said closing assembly (1) has an extension in the longitudinal direction between 20 and 30 cm.

6. The closing assembly (1) according to claim 1, wherein the ejector springs (11*a*, 11*b*) extend around the ejector assembly (7).

7. The closing assembly (1) according to claim 1, wherein the ejector springs (11*a*, 11*b*) are arranged between the surface of a first annular flange (8*a*) associated with a first upper end (7*a*) of the ejector assembly (7) and the surface of a second annular flange (8*b*) associated near a second lower end (7*b*) of the ejector assembly (7) and opposite to the first annular flange (8*a*).

8. The closing assembly (1) according to claim 1, wherein the coupling means (13*a*) are provided at an upper end (12) of the internal rod (13).

9. A closing assembly (1) for capping heads for a capping machine, the closing assembly comprising:

a movable part (3) which is provided, at a lower end thereof, with a crimping end (5) and which in turn houses an ejector assembly (7), and an elastic pre-centering means arranged between said ejector assembly (7) and said movable part (3), wherein said ejector assembly (7) is slidable with respect to said movable part (3), wherein elastic ejector means (11*a*, 11*b*) is arranged between said movable part (3) and said ejector assembly (7), and wherein said ejector assembly (7) is connected to an internal rod (13) which protrudes from said movable part (3) and is provided with coupling means (13*a*).

10. A roto-translating capping head (210) for a capping machine comprising:

a piston comprising in turn a spindle (211), a lifting rod (214), disposed within said spindle (211), and a closing assembly (1) attached to said piston, the closing assembly having a movable part (3) which is provided, at a lower end thereof, with a crimping end (5) and which in turn houses an ejector assembly (7), said ejector assembly (7) being slidable with respect to said movable part (3), and elastic ejector means (11*a*, 11*b*) being arranged between said movable part (3) and said ejector assembly (7), said ejector assembly (7) being connected to an internal rod (13) which protrudes from said movable part (3) and being provided with coupling means (13*a*), said spindle (211) being connected to said movable part (3) of said closing assembly (1), and said lifting rod (214) being provided with coupling means (214*a*) capable of cooperating with said coupling means (13*a*) of said internal rod (13) of said closing assembly (1).

11. The roto-translating capping head (210) according to claim 10, wherein said coupling means (214*a*) of said lifting rod (214) are anti-rotation coupling means.

12. The roto-translating capping head (210) according to claim 11, further comprising a connecting device (50) allowing facilitating the operations of fixing the closing assembly (1) to the capping head (210), wherein said connecting device (50) comprises a first element (51) associated with the lower end (211*a*) of the spindle (211) of the piston of the capping head (210) and a second element (61) associated with an upper end (1*a*) of the closing assembly (1), said first and second elements being provided with first fixing means (55) and second fixing elements (65), respectively, that are complementary to each other and cooperate with each other to facilitate the operations of fixing the closing assembly (1) to the capping head (210).

13. The roto-translating capping head (210) according to claim 10, further comprising a connecting device (50) allowing facilitating the operations of fixing the closing assembly (1) to the capping head (210), wherein said connecting device (50) comprises a first element (51) associated with the lower end (211*a*) of the spindle (211) of the piston of the capping head (210) and a second element (61) associated with an upper end (1*a*) of the closing assembly (1), said first and second elements being provided with first fixing means (55) and second fixing elements (65), respectively, that are complementary to each other and cooperate with each other to facilitate the operations of fixing the closing assembly (1) to the capping head (210).

14. A capping machine (300) comprising:

a turret (302);

one or more capping heads, circumferentially arranged around said turret (302);

an upper plate (320*a*), lined up with said turret (302), having one or more seats (322*a*), circumferentially arranged, and suitable for accommodating respective capping heads (210), wherein said upper plate (320*a*) is driven in rotation about the central axis of said turret (302) and thus drags said one or more capping heads; wherein each capping head is provided with at least one roller (230) and a sprocket (252) arranged around the axis of the capping head;

a cam profile (340) in which said roller (230) of said capping head rolls during rotation of each capping head about the central axis of said turret (302);

a gear system extending through said turret (302), between an electric actuator (360) and said one or more capping heads, and comprising a central driving sprocket (350) which, either directly or through a gear train (354), meshes with said sprocket (252) of each capping head;

wherein the capping machine comprises an adjusting system for adjusting a rotational speed of said central sprocket (350), and wherein a closing assembly (1) according to claim 1 is installed on said one or more capping heads.

15. The capping machine (300) according to claim 14, wherein said adjusting system for adjusting the rotational speed of said central sprocket (350) is controlled by said electric actuator (360).

16. The capping machine (300) according to claim 15, wherein said central sprocket (350) is mounted at the lower end of a cylindrical flange (356), rotatably mounted about the central axis (A) of said turret (302), and wherein said cylindrical flange (356) is further provided with a second crown gear (358) that meshes with the output shaft (362) of said electric actuator (360).

17. A roto-translating capping head (210) for capping machine comprising a piston comprising in turn a spindle (211), and a lifting rod (214), disposed within said spindle (211), characterized in that a closing assembly (1) according to claim 8 is attached to said piston, said spindle (211) being connected to said movable part (3) of said closing assembly (1), and said lifting rod (214) being provided with coupling means (214*a*) capable of cooperating with said coupling means (13*a*) of said internal rod (13) of said closing assembly (1).

18. The roto-translating capping head (210) according to claim 17, wherein said coupling means (214*a*) of said lifting rod (214) are anti-rotation coupling means.

19. The roto-translating capping head (210) according to claim 18, further comprising a connecting device (50) allowing facilitating the operations of fixing the closing assembly (1) to the capping head (210), wherein said connecting device (50) comprises a first element (51) associated with the lower end (211*a*) of the spindle (211) of the piston of the capping head (210) and a second element (61) associated with an upper end (1*a*) of the closing assembly (1), said first and second elements being provided with first fixing means (55) and second fixing elements (65), respectively, that are complementary to each other and cooperate with each other to facilitate the operations of fixing the closing assembly (1) to the capping head (210).

20. The roto-translating capping head (210) according to claim 17, further comprising a connecting device (50) allowing facilitating the operations of fixing the closing assembly (1) to the capping head (210), wherein said connecting device (50) comprises a first element (51) associated with the lower end (211*a*) of the spindle (211) of the piston of the capping head (210) and a second element (61) associated with an upper end (1*a*) of the closing assembly (1), said first and second elements being provided with first fixing means (55) and second fixing elements (65), respectively, that are complementary to each other and cooperate with each other to facilitate the operations of fixing the closing assembly (1) to the capping head (210).

* * * * *